United States Patent Office 2,951,828
Patented Sept. 6, 1960

2,951,828

PROCESS FOR THE PRODUCTION OF BEAD POLYMERIZATES FROM CYCLIC INTERNAL ESTERS OF α-HYDROXY CARBOXYLIC ACIDS

Karl Zeile, Herbert Köppe, and Wilhelm Konz, Ingelheim, Germany, assignors to C. H. Boehringer Sohn, Ingelheim (Rhine), Germany, a partnership No Drawing. Filed Feb. 27, 1958, Ser. No. 717,810

Claims priority, application Germany Mar. 4, 1957

6 Claims. (Cl. 260—77.5)

This invention relates to a process for the production of bead polymerizates, and more particularly to the bead polymerization of cyclic internal esters of α-hydroxy carboxylic acids.

It is known that polymerizable monomers, such as monomeric vinyl derivatives, acrylic acid derivatives or olefins and mixtures thereof, can be bead-polymerized by suspending the monomers in a liquid in which they are not soluble and polymerizing the suspended monomers with the aid of suitable polymerization catalysts and application of heat, if necessary, into high-molecular-weight polymeric masses in bead form. The monomers are preferably suspended in water by stirring the aqueous mixture and adding suitable suspension stabilizers.

It is also known that cyclic esters of α-hydroxy carboxylic acids, which are commonly referred to as estolides, such as glycolide or lactide and their derivatives, can be polymerized. The polymerization into the corresponding polyesters is usually carried out in solution or in bulk.

However, the above two processes for the production of polyesters have serious disadvantages. In the solution polymerization process, for example, large amounts of solvents in relation to the quantity of monomer are required to bring the highly viscous solutions of the polymers to a workable consistency. Examples of solvents used in this polymerization process are benzene or toluene. For isolation of the dissolved polymerizates it is necessary to precipitate the same, for example with methanol. For further treatment of the precipitated polymerizate, a subsequent granulation treatment at elevated temperature is required.

A corresponding bulk polymerizate must either be put into solution for further granulation treatment and worked up similar to the product of the solution polymerization, or it must be pressed into ribbons directly from the flowing melt and thereafter granulated. Such treatment steps are always accompanied by a thermal degradation due to the required high temperatures, which in turn is detrimental to the chemical and mechanical properties of the polymerizate.

If the known principles of suspension bead-polymerization are applied to the production of polyesters from estolides of α-hydroxy carboxylic acids in the presence of known suspension stabilizers, such as water-soluble high polymers (gelatins, tragacanth, methylcellulose, polyvinyl alcohol), or finely divided barium sulfate, magnesium carbonate, calcium phosphate or aluminum hydroxide, a non-uniform, caked product, which is not capable of being handled as a free-flowing mass, is obtained instead of a bead polymerizate.

We have found that estolides of α-hydroxy carboxylic acids, suspended in an inert organic hydrocarbon or a hydrocarbon mixture in which the monomer is only slightly soluble or insoluble and in which the polymer is insoluble, can be bead-polymerized into polyesters having very good chemical and physical properties and with good yields if di-hydrocarbon siloxane silicone oils having a viscosity within the range of 50 to 1500 centistokes are used as suspension stabilizers in amounts of 0.05 to 1.0% by weight, based on the weight of estolide, and halides of the metals of groups I, II, IV, V, VI and VII of the periodic system are used as polymerization catalysts in amounts from 0.1 to 1.0% by weight, based on the weight of monomer, and if the polymerization is carried out at elevated temperatures accompanied by stirring.

The polyesters cannot be produced from estolides of α-hydroxy carboxylic acids in the aqueous phase because of the reversible saponification reaction which occurs simultaneously.

Inert organic suspension agents which may be used for the bead-polymerization of estolides of α-hydroxy carboxylic acids according to the present invention include aliphatic, cyclic or acyclic hydrocarbons, or their mixtures with aromatic hydrocarbons, which boil in the range between 80 and 250° C. Particular examples of inert suspension agents are the following: petroleum ether, hydrocumene, a petroleum ether-toluene mixture (90:10) or a hydrocumene-xylene mixture (95:5). The ratio of suspension agent to monomer is advantageously between 2:1 and 5:1 parts by weight.

As catalysts for the suspension polymerization of the estolides of α-hydroxy carboxylic acids, the halides of the metals of group IV of the periodic system, especially $SnCl_4$, $SnCl_2$, $TiCl_4$, are particularly useful. However, the halides of the metals of groups I, II, V, VI and VII may also be used, but their catalytic effect is not as pronounced as that of the metal halides of group IV.

The bead-polymerization according to the present invention is advantageously carried out in a temperature range of 60 to 180° C. In general, the period of polymerization is 3 to 15 hours. It is further advantageous to work in an inert gas atmosphere, for example in an atmosphere of nitrogen.

Optically active as well as optically inactive estolides of α-hydroxy carboxylic acids are suited for use in the process of the present invention. In general, the polyesters produced from optically active estolides are characterized by higher melting points (softening points) in comparison with those produced from the corresponding optically inactive estolides.

The size of the beads obtained by the process depends not only upon the speed of stirring but also upon the ratio of suspension agent to monomer, upon the temperature, and upon the type and amount of catalyst employed. For example, a high stirring speed and a ratio of suspension agent to monomer of 2:1 produces very fine beads (diameter <0.2 mm.), while a low stirring speed and a larger ratio of suspension agent and monomer produces larger beads (diameter >0.2 mm.).

The mechanical properties, especially the strength, of the polymerizate produced in accordance with the process of the invention, as well as its thermostability, can be improved considerably by the addition of small amounts of diisocyanate to the polymerization suspension. The same effect, only to a lesser degree, can be achieved by adding any desired alcohol or a simple isocyanate to the polymerization suspension. The quantity of diisocyanate, alcohol or isocyanate may vary between 0.1 and 0.5% by weight, based on the weight of monomer used as starting material.

The bead polymerizates obtained by the process according to the present invention are, as a rule, colorless and are marked by a particularly high degree of polymerization. The polymerizates are insoluble in water, methanol or ethanol. By adding fillers or dyes to the suspension, these inert additives may be incorporated into the polymers without any difficulty.

In practice, the process according to the present invention is advantageously performed as follows:

The estolide of the α-hydroxy carboxylic acid and the suspension agent are placed into a vessel provided with a stirring device and a reflux cooler. After melting the estolide, 0.05 to 1.0% by weight one of the di-hydrocarbon siloxane silicone oil, based on the weight of estolide, and the polymerization catalyst are added. Thereafter, while introducing an inert gas and vigorously stirring the mixture, it is raised to the desired temperature. Upon completion of the polymerization the polymer, which smoothly precipitates at the bottom of the vessel, is separated from the suspension agent and freed from adhering suspension agent and di-hydrocarbon siloxane silicone oil with the aid of a solvent, for example a low-boiling-point hydrocarbon and methanol. The polymerizate is practically colorless, transparent and can selectively be produced in a bead size most favorable for the intended subsequent use. The high apparent density of 0.9 to 1.1, coupled with the bead form, makes the bead polymerizate an ideal, easy-to-handle, free-flowing mass. The yields are above 95%, based on the monomer, i.e. far above those of the known solution polymerization process.

The process according to the present invention makes it possible to transform estolides of α-hydroxy carboxylic acids into polyesters in bead form in an especially gentle manner. This process has considerable advantages over the known methods of polymerizing estolides of α-hydroxy carboxylic acids in solvents and in bulk. The bead polymerizate is formed in a single process step and can be worked up directly into ribbons, rods, foils, fibers, and the like, without any intervening additional solution, precipitation or granulation step.

The following examples will further illustrate the present invention and enable others skilled in the art to understand the invention more completely. It is understood, however, that we do not intend to limit our invention to the particular examples given below.

*Example I*

100 gm. optically active lactide $[\alpha]_D^{20} = -285°$ were heated with 300 cc. petroleum ether (B.P.=140–180° C.) in an atmosphere of nitrogen until the lactide melted. Thereafter, 0.5 cc. silicone oil and 0.3 gm. SnCl$_4$ were added to the maxture and while stirring the suspension at the rate of 600 r.p.m. it was maintained for five hours at 160° C. 96 gm. of a bead polymerizate were obtained, which was faintly yellow and had a softening point between 160 and 170° C. 90% of the beads had a diameter of 0.2 to 1.0 mm.

*Example II*

100 gm. optically active lactide $[\alpha]_D^{20} = +275°$ together with 300 cc. hydrocumene were heated in an atmosphere of nitrogen until the lactide melted. Thereafter, 0.5 cc. silicone oil and 0.5 gm. SnCl$_2$ were added to the mixture and it was stirred at a rate of 1000 r.p.m. The resulting suspension was maintained at 145° C. for 14 hours while continuing to stir at the indicated rate. 95 gm. of a colorless bead polymerizate having a softening point of 155 to 165° C. were obtained. The beads had a diameter of <0.2 mm.

*Example III*

1000 gm. optically active lactide $[\alpha]_D^{20} = -280°$ and 2500 cc. petroleum ether (B.P. 100–140° C.) were heated in an atmosphere of nitrogen until the lactide melted. Thereafter, 2.5 cc. silicone oil and 3 gm. SnCl$_4$ were added to the mixture, which was then stirred at a rate of 400 r.p.m. The resulting suspension was then maintained at 135° C. for 15 hours while continuing to stir at the indicated rate. 985 gm. of a bead polymerizate having a softening point of 160 to 170° C. were obtained. 35 gm. of the beads had a diameter of >0.5 mm., 50 gm. had a diameter of <0.2 mm. and 900 gm. had a diameter between 0.2 and 0.5 mm.

*Example IV*

100 gm. optically active lactide $[\alpha]_D^{20} = -290°$ together with 200 cc. petroleum ether (B.P. 160–180° C.) and 100 cc. toluene were heated in an atmosphere of nitrogen until the lactide melted. Thereafter, 0.3 gm. SnCl$_4$ and 0.5 gm. silicone oil were added and the mixture was stirred at a rate of 560 r.p.m. The resulting suspension was maintained at 140° C. for 13 hours while continuing to stir at the indicated rate. The yield was 95 gm. of a bead polymerizate having a softening point between 155 and 170° C. 25 gm. of the beads had a diameter of >2 mm., 10 gm. had a diameter of 0.5 to 2 mm., 45 gm. had a diameter of 0.2 to 0.5 mm. and 15 gm. had a diameter of <0.2 mm.

*Example V*

100 gm. optically inactive lactide together with 300 cc. petroleum ether (180–220° C.) were heated in an atmosphere of nitrogen until the lactide melted. Thereafter, 0.5 gm. SnCl$_2$ and 0.5 gm. silicone oil were added and the mixture was stirred at the rate of 600 r.p.m. The resulting suspension was maintained at 175° C. for nine hours while continuing to stir at the indicated rate. The yield was 98 gm. of a bead polymerizate having a softening point between 115 and 125° C. 75 gm. of the beads had a diameter of 0.2 to 0.5 mm. and 23 gm. had a diameter of 0.5 to 1.0 mm.

*Example VI*

100 gm. optically inactive lactide together with 200 cc. hydrocumene were heated in an atmosphere of nitrogen until the lactide melted. Thereafter, 0.3 cc. silicone oil and 0.3 gm. SnCl$_4$ were added and the mixture was stirred at the rate of 560 r.p.m. The resulting suspension was maintained at 150° C. for 15 hours while continuing to stir at the indicated rate. The yield was 97 gm. of a bead polymerizate having a softening point between 125 and 135° C. All of the beads had a diameter of less than 0.5 mm.

*Example VII*

75 gm. optically active lactide $[\alpha]_D^{20} = -280°$ and 25 gm. optically inactive lactide were heated together with 300 cc. hydrocumene in an atmosphere of nitrogen until all of the lactide had melted. Thereafter, 0.5 gm. SnCl$_4$ and 1.0 cc. silicone oil were added and the mixture was stirred at the rate of 600 r.p.m. The resulting suspension was maintained at 120° C. for 10 hours while continuing to stir at the indicated rate. The yield was 99 gm. of a bead polymerizate having a softening point between 115 and 125° C. 80 gm. of the beads had a diameter of >0.2 mm.

*Example VIII*

50 gm. optically active lactide $[\alpha]_D^{20} = -285°$ and 50 gm. optically inactive lactide together with 300 cc. petroleum ether (B.P. 100–140° C.) were heated in an atmosphere of nitrogen until all of the lactide had melted. Thereafter, 0.5 cc. silicone oil and 0.3 gm. SnCl$_4$ were added and the mixture was stirred at the rate of 600 r.p.m. The resulting suspension was maintained at 90° C. for 15 hours while continuing to stir at the indicated rate. The yield was 95 gm. of a bead polymerizate having a softening point between 110 and 120° C. 90 gm. of the beads had a diameter of >0.2 mm.

*Example IX*

25 gm. optically active lactide $[\alpha]_D^{20} = -280°$ and 75 gm. optically inactive lactide with 300 cc. hydrocumene were heated in an atmosphere of nitrogen until all of the lactide had melted. Thereafter, 0.3 gm. silicone oil and 0.5 gm. SnCl$_4$ were added and the mixture was stirred at the rate of 1000 r.p.m. The resulting suspension was maintained at 145° C. for 12 hours while continuing to stir at the indicated rate. The yield was 97 gm. of a bead polymerizate having a softening point between 110 and 125° C. 20 gm. of the beads had a diameter of >0.2 mm. and 75 gm. had a diameter of <0.2 mm.

*Example X*

100 gm. optically active lactide $[\alpha]_D^{20}=-270°$ together with 300 cc. petroleum ether were heated in an atmosphere of nitrogen until all of the lactide had melted. Thereafter, 0.5 cc. silicone oil and 0.3 gm. SnCl$_4$ were added and the mixture was stirred at the rate of 560 r.p.m. The resulting suspension was maintained at 145° C. for 15 hours while continuing to stir at the indicated rate. Prior to stirring, 0.3 gm. octyl alcohol were also added to the mixture. 100 gm. of a bead polymerizate were obtained.

*Example XI*

100 gm. optically active lactide $[\alpha]_D^{20}=-285°$ together with 300 cc. hydrocumene were heated in an atmosphere of nitrogen until the lactide had melted. Thereafter, 0.5 cc. silicone oil, 0.3 gm. SnCl$_4$ and 0.15 gm. trichloroethanol were added and the mixture was stirred at the rate of 560 r.p.m. The resulting suspension was maintained at 140° C. for 12 hours while continuing to stir at the indicated rate. The yield was 96 gm. of bead polymerizate.

*Example XII*

100 gm. optically active lactide $[\alpha]_D^{20}=-275°$ together with 300 cc. hydrocumene were heated in an atmosphere of nitrogen until the lactide had melted. Thereafter, 0.5 cc. silicone oil and 0.3 gm. SnCl$_4$ were added and the mixture was stirred at a rate of 560 r.p.m. The resulting suspension was maintained at 145° C. for 14 hours while continuing to stir at the same rate. After the first hour 0.2 gm. hexamethylene diisocyanate were added. The yield was 95 gm. bead polymerizate.

*Example XIII*

100 gm. optically active lactide $[\alpha]_D^{20}=-285°$ together with 300 cc. petroleum ether (B.P. 160–180° C.) were heated in an atmosphere of nitrogen until the lactide had melted. Thereafter, 0.5 cc. silicone oil, 0.3 gm. SnCl$_4$ and then 0.2 gm. p-phenylene-diisocyanate were added and the mixture was stirred at a rate of 560 r.p.m. The resulting suspension was maintained at 145° C. for 15 hours while continuing to stir at the above rate. The yield was 94 gm. bead polymerizate.

*Example XIV*

100 gm. optically inactive lactide together with 300 cc. hydrocumene were heated in an atmosphere of nitrogen until the lactide melted. Thereafter, 0.5 cc. silicone oil, 0.3 gm. SnCl$_4$ and then 0.2 gm. p-phenylene-diisocyanate were added and the mixture was stirred at a rate of 560 r.p.m. The resulting suspension was maintained at 145° C. for six and a half hours while continuing to stir at the indicated rate. The yield was 100 gm. bead polymerizate.

*Example XV*

100 gm. optically inactive lactide together with 300 gm. petroleum ether were heated until the lactide melted. Thereafter, 0.5 cc. silicone oil and 0.3 gm. SnCl$_4$ were added and the mixture was stirred at a rate of 560 r.p.m. The resulting suspension was maintained at 145° C. for 14 hours, while continuing to stir at the indicated rate. After the first hour, 0.2 gm. phenyl-isocyanate were added to the suspension. The yield was 95 gm. bead polymerizate.

*Example XVI*

100 gm. optically active lactide $[\alpha]_D^{20}=-280°$ together with 300 cc. petroleum ether (B.P. 140–180° C.) were heated in an atmosphere of nitrogen until the lactide melted. Thereafter, 0.5 cc. silicone oil, 0.3 gm. SnCl$_4$ and then 0.2 gm. phenyl-isocyanate were added and the mixture was stirred at the rate of 560 r.p.m. The resulting suspension was maintained at 135° C. for 12 hours while continuing to stir at the indicated rate. The yield was 96 gm. bead polymerizate.

The same results were obtained when 0.2–0.3 gm. naphthylene-1,5-diisocyanate or 0.2–0.3 gm. toluylene-diisocyanate were added in place of the phenyl-isocyanate.

The silicone oils used in the preceding examples are manufactured by A. Wacker of Munich, Germany, under the mark "AK-silicone oils" and have a viscosity of 50–1500 centistokes.

While we have illustrated our invention with the aid of certain specific embodiments, it will be apparent to those skilled in the art that the invention is not limited to these embodiments and that various changes and modifications may be made without departing from the spirit of the invention or the scope of the appended claims.

We claim:

1. The method of bead-polymerizing lactide, which comprises suspending said lactide in an inert organic hydrocarbon in which the lactide is substantially insoluble and in which the resulting polymer is completely insoluble, and heating said suspension to a temperature within the range of 60 to 180° C. for 3 to 15 hours in the presence of 0.05 to 1.0% by weight of a di-hydrocarbon siloxane silicone oil having a viscosity of 50 to 1500 centistokes, based on the weight of lactide, and 0.1 to 1.0 part by weight per 100 parts of starting material of a halide of a metal selected from the group consisting of metals from groups I, II, IV, V, VI and VII of the periodic system of elements, while continuously stirring the suspension.

2. The method of bead-polymerizing lactide as in claim 1, wherein said inert organic hydrocarbon is selected grom the group consisting of those aliphatic, cyclic and acyclic hydrocarbons and mixtures thereof which have a boiling point within the range of 80 to 250° C.

3. The method of bead-polymerizing lactides as in claim 1, wherein said metal halide is the halide of a metal of group IV of the periodic system of elements.

4. The method of bead-polymerizing lactide as in claim 1, wherein said lactide suspension is heated in an atmosphere of an inert gas.

5. The method according to claim 4, wherein said inert gas is nitrogen.

6. The method of bead-polymerizing lactide as in claim 1, which comprises in addition heating said lactide suspension in the presence of from 0.1 to 0.5% by weight, based on the weight of lactide, of a substance selected from the group consisting of naphthylene-1,5-diisocyanate, p-phenylene-diisocyanate, phenylisocyanate, hexamethylene - diisocyanate, trichloroethanol and octyl alcohol.

References Cited in the file of this patent

UNITED STATES PATENTS

| | | |
|---|---|---|
| 2,486,993 | Sowa | Nov. 1, 1949 |
| 2,703,316 | Schneider | Mar. 1, 1955 |

OTHER REFERENCES

Chemical and Engineering News, vol. 24, pp. 1233–1234 (May 10, 1946).